United States Patent [19]

Manfroni

[11] 4,231,547

[45] Nov. 4, 1980

[54] DISPENSING VALVE FOR LIQUIDS

[75] Inventor: Ezio Manfroni, Bologna, Italy

[73] Assignee: Carpigiani Bruto Macchine Automatiche S.p.A., Bologna, Italy

[21] Appl. No.: 13,810

[22] Filed: Feb. 22, 1979

[30] Foreign Application Priority Data

Mar. 1, 1978 [IT] Italy .................... 12500 A/77

[51] Int. Cl.³ .................... F16K 31/00; A23G 9/00
[52] U.S. Cl. .................... 251/210; 251/284; 251/325; 251/353; 62/342; 222/524
[58] Field of Search .............. 251/353, 297, 325, 284; 222/524, 531, 547, 564, 559; 62/342

[56] References Cited

U.S. PATENT DOCUMENTS

| | | | |
|---|---|---|---|
| 247,668 | 9/1881 | Loftus | 251/325 |
| 605,321 | 6/1898 | Lines | 222/524 |
| 648,455 | 5/1900 | Farson | 251/353 |
| 1,458,718 | 6/1923 | Lord | 251/210 |
| 2,220,170 | 11/1940 | Nelson | 251/210 |
| 2,379,327 | 6/1945 | Waite | 222/547 |
| 2,916,044 | 12/1959 | Phelan et al. | 137/375 |
| 3,476,133 | 11/1969 | Stedfeld | 251/297 |
| 3,698,206 | 10/1972 | Werner | 62/342 |

FOREIGN PATENT DOCUMENTS 368496 3/1932 United Kingdom ............... 222/559

Primary Examiner—Martin P. Schwadron
Assistant Examiner—A. Michael Chambers
Attorney, Agent, or Firm—Larson, Taylor and Hinds

[57] ABSTRACT

A dispensing valve comprising: a first tubular member closed at one end by a wall; a second tubular member telescopically housed in said first tubular member and closed at the opposite end by a wall; said second tubular member being slidable with respect to said first member from a rest position in which it is housed inside said first tubular member into abutment against its end wall, to a position in which it projects out of said first tubular member; a piston like member secured to the closure wall of said first tubular member and capable of slidingly penetrating with a close fit into the tubular passage of said second tubular member for a distance shorter than the maximum sliding stroke of said second tubular member with respect to said first tubular member; a first radial inlet port in said first tubular member at a position near its closed end, and a second radial outlet port in said second tubular member at a position in which said outlet port is wholly housed inside said first tubular member in the said rest position.

4 Claims, 2 Drawing Figures

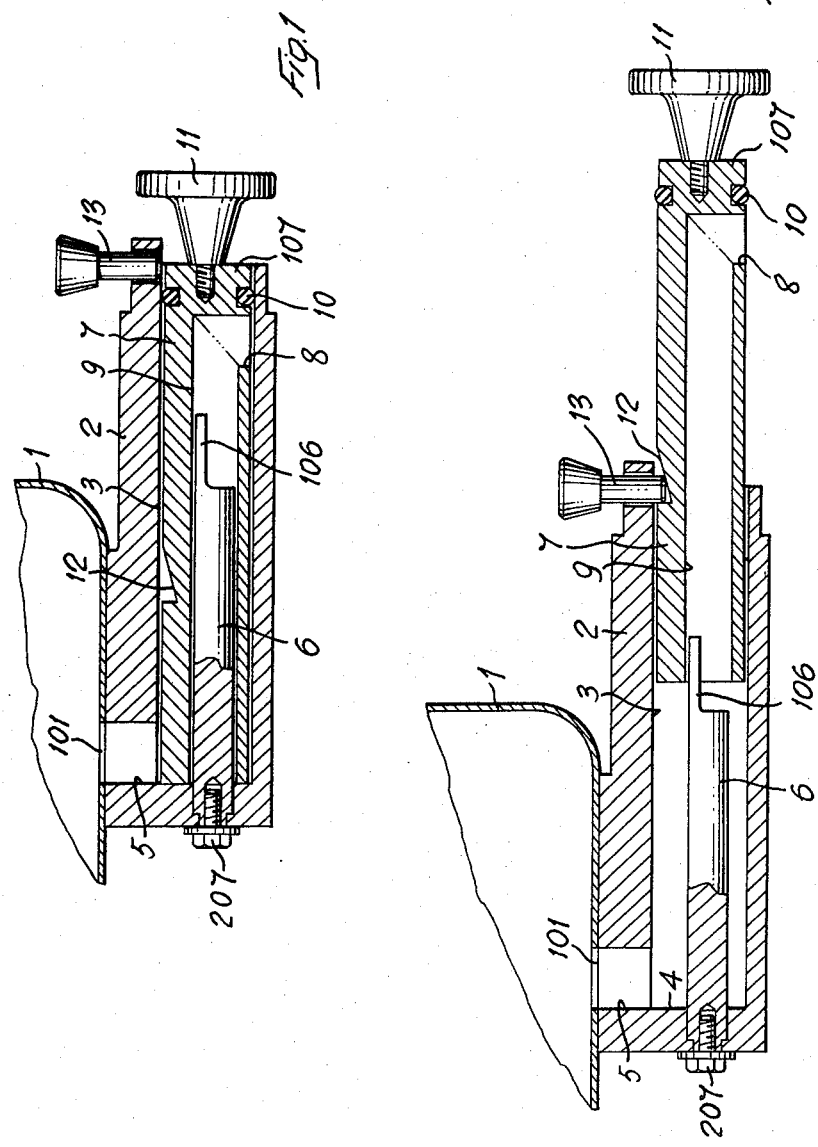

DISPENSING VALVE FOR LIQUIDS

FIELD OF THE INVENTION

This invention relates to a dispensing valve for liquids, and more particularly to a dispensing valve for perishable liquids, and for instance foodstuff liquids, like milk, liquid mixes for the ice cream manufacture and the like, in which it is necessary to eliminate as much as possible stagnation points, or where it is necessary to avoid that the feed ducts be exposed to bacteriological contamination. The dispensing valve of the invention is particularly suitable for use in pastorizers or the like apparatus.

PRIOR ART STATEMENT UNDER 37 CFR 1.56

The following relevant prior art is known to Applicant: U.S. Pat. No. 2,916,044 to L. A. M. Phelan et Al, filed Sept. 18, 1956 and granted Dec. 8, 1959. The whole document.

BACKGROUND OF THE INVENTION

One of the main disadvantages of the known dispensing valves for liquids, as evidenced for instance by the device shown in the U.S. Pat. No. 2,916,044, resides in the fact that the liquid pouring nozzle is always exposed to contamination, thus contaminating the pastorized liquids poured therethrough.

Another disadvantage of the known dispensing valves for use in pastorizers, is that the valve has to extend a certain length sidewise of the pastorizing vessel.

This means that the feed duct from the pastorizing vessel to the valve always contains a substantial amount of stagnating liquid, which is not subject, or is only insufficiently subject to the requested heat treatments.

SUMMARY OF THE INVENTION

The above and other disadvantages and drawbacks of the known dispensing valves for liquids are eliminated by the dispensing valve according to the invention, which according to its main feature comprises: a first tubular member closed at one end by a wall; a second tubular member telescopically housed in said first tubular member and closed at the opposite end by a wall; said second tubular member being slidable with respect to said first tubular member from a rest position in which it is housed inside said first tubular member into abutment against its end wall, to a second position in which it projects out of said forst tubular member; a piston like member secured to the closure wall of said first tubular member and capable of slidingly penetrating with a close fit into the tubular passage of said second tubular member for a distance shorter than the maximum operational stroke of said second tubular member with respect to said first tubular member; a first radial inlet port in said first tubular member at a position near its closed end, and a second radial outlet port in said second tubular member at a position in which said outlet port is wholly housed inside said first tubular member in said rest position of the valve.

According to a further feature of the invention, disengageable means are provided for limiting the maximum projection stroke of the second tubular member with respect to the first tubular member.

According to a still further feature of the invention, means are provided for avoiding a relative rotation of said first and second tubular members.

According to another feature of the invention, sealing means are provided for forming a tight seal between the said first and second tubular member in the rest position of the device, at the open end of the said tubular member.

According to another feature of the invention, means are provided on said second tubular member for hand-operating same.

BRIEF DESCRIPTION OF THE DRAWINGS

Further objects and advantages of the dispensing valve according to the invention will become apparent from the following specification, made with reference to the accompanying drawing showing one preferred embodiment of the invention, in which:

FIG. 1 is a longitudinal sectional side view of one embodiment of a dispensing valve according to the invention, in its rest or closed position, and FIG. 2 is a view similar to FIG. 1, of the same dispensing valve in its completely extracted, liquid delivering position.

DESCRIPTION OF THE PREFERRED EMBODIMENT OF THE INVENTION

With reference to the drawing, numeral 1 denotes a tank for the liquid to be dispensed. The said tank may, for instance, by the pastorizing tank of a pastorizing device, or the like.

To the bottom of the tank 1, on its outer side, the dispensing valve according to the invention is mounted. The said valve comprises an outer tubular member 2, provided with a longitudinal cylindrical passage 3, extending from one end of the outer member 2 up to its opposite end, which is closed by a bottom wall 4. The tubular member 2 is provided, tangentially to the inner side of the wall 4, with a radial duct 5 into communication with the discharge port 101 formed in the bottom of the tank 1.

A piston-like cylindrical member 6 is mounted inside the cylindrical passage 3, eccentrically thereof, and is secured by one end to the bottom wall 4, by means of a screw 207. The piston-like member 6 is of an outer diameter substantially smaller than the inner diameter of the passage 3, and it extends from the bottom wall 4 along the passage 3, with its axis parallel to the axis of said passage, for a distance shorter than the length of the passage 3. The free end of the piston like member 6 terminates with a pointed lip 106.

Inside of the outer tubular member 3 an inner tubular member 7 is axially slidably mounted with a tight fit, so as to telescope with respect to the outer member 3. The tubular passage 9 of the inner member 7 is unobstructed at its end facing the outer member 3, whilst it is closed at its opposite, outer end by a bottom wall 107.

The passage 9 is of a diameter equal to the outer diameter of the piston like member 6, and is bored eccentrically with respect to the axis of the inner member 7, by an amount such as to be, in one position of angular adjustement of the inner and outer members, into axial alignement with the axis of the piston like member 6.

The inner tubular member 7 is provided, at a position near the bottom wall 107, with a radial delivery port 8, putting into communication the passage 9 with the exterior.

The inner tubular member 7 is provided near its closed end with an external annular groove for accomodation of an annular sealing ring 10. To the outer end of the inner tubular member 7 a hand grip 11 is secured.

The inner member 7 is provided on its outer mantle at a position intermediate its length with a notch 12, cooperating with a pin 13 freely passing through a radial bore formed near the free end of the outer tubular member 2.

The operation of the described dispensing valve will be evident. With the inner tubular member fully inserted within the outer member 2 (position of FIG. 1) the valve is completely closed. In order to open the valve, the inner member 7 is pulled outwardly, by acting on the hand grip 11. As soon as the inner member 7 has been pulled outwardly by a stroke exceeding the length of that portion of the piston-like element 6 which closely fits the inside of passage 3, the liquid from tank 1 flows through port 101, duct 5, duct 3, duct 9 and port 8 to the exterior. Whenever it is desired to stop the flow of liquid, it is simply necessary to push the inner member 7 inwardly, until the piston-like element 6 again penetrates into the duct 9. In order to completely close the valve, the inner member 7 is pushed completely inside, to its rest position of FIG. 1. In its closed position, the valve is very compact and is thermically conditioned by heat-transmission through the bottom of the tank 1. The pouring port 8 is completely covered in the rest position of the valve, and any contamination of this port is thus avoided. The inner member 7 may be easily disassembled from the valve, by lifting the pin 13, and pulling out the said inner member 7, so that a thorough cleaning of the device may be easily performed.

Thanks to the eccentricity of the piston like member 6, the inner member 7 cannot be rotated, and thus the discharge port 8 is always directed downwardly.

I claim:

1. A dispensing valve for liquids comprising:
    a first tubular member closed at one end, completely opened at its other end, and including an inlet port through the side thereof near the closed end,
    a second tubular member telescopically slidably housed in the first tubular member and completely open at its end which faces the said closed end of the first tubular member and completely closed at its opposite end, the open end of the second tubular member being movable to abut the said closed end of the first tubular member, said second tubular member having an outlet port through the side thereof near the closed end of the second tubular member, said second tubular member being of a length relative to the first tubular member that in a closed position whereat the open end of the second tubular member abuts the closed end of the first tubular member, the outlet port is wholly within the first tubular member,
    stop means for limiting the maximum outward stroke of the second tubular member away from its closed position toward an open position,
    and a piston member fixed at one of its ends to the closed end of the first tubular member and extending therefrom into the interior of the second tubular member and at least a portion of said piston having an outer diameter which closely fits the interior of the second tubular member to substantially prevent fluid flow between the piston member and the interior of the second tubular member when the second tubular member engages the portion of the piston member, said portion extending from said closed end of the first tubular member outwardly farther than said inlet port but less than the said maximum outward stroke of the second tubular member.

2. A valve according to claim 1, said stop means further comprising disengageable abutment means for limiting the maximum outward stroke of the second tubular member with respect to the first tubular member.

3. A valve according to claim 1, further comprising means for avoiding relative rotation of said first and second tubular members.

4. A valve according to claim 1, further comprising means for providing a tight seal between the said first and second tubular member in the closed position of the valve.

* * * * *